United States Patent [19]
Layre

[11] 3,948,157
[45] Apr. 6, 1976

[54] BREW CUP FILTER
[75] Inventor: John C. Layre, Warminster, Pa.
[73] Assignee: Refreshment Machinery Incorporated, Warminster, Pa.
[22] Filed: Mar. 10, 1975
[21] Appl. No.: 556,606

[52] U.S. Cl. .................... 99/289 R; 99/298; 99/321
[51] Int. Cl.² ..................... A47J 31/40; A47J 31/60
[58] Field of Search ............ 99/289, 298, 300, 304, 99/306, 310, 312–313, 314, 321; 210/474, 478–479, 489; 222/95

[56] References Cited
UNITED STATES PATENTS

| | | | |
|---|---|---|---|
| 1,480,413 | 1/1924 | Pedersen | 99/321 UX |
| 1,543,340 | 6/1925 | Newberry | 99/321 X |
| 1,740,136 | 12/1929 | Aborn | 99/321 X |
| 2,522,102 | 9/1950 | Dold | 99/321 UX |
| 3,122,422 | 2/1964 | Roots | 99/298 UX |
| 3,483,811 | 12/1969 | Heier | 99/289 |

Primary Examiner—Stanley N. Gilreath
Assistant Examiner—Arthur O. Henderson
Attorney, Agent, or Firm—Seidel, Gonda & Goldhammer

[57] ABSTRACT

A filter is provided for a brew cup for use in a hot beverage brewing machine such as a coffee brewing and dispensing machine. The filter is attached to the inside of a brew cup about halfway up the side walls and to the center of a guide spider axially movable within the brew cup. By this arrangement, spent grounds and fines are prevented from traveling with the brewed coffee or other beverage as it passes through the brew cup. When the brew cup mechanism is inverted and moved to the dumping station, this arrangement provides for the dumping of substantially all of the spent grounds and fines by a snap action applied to the spider and the filter material. The filter material is restrained from engaging the floor of the brew cup to prevent clogging and caking of the filter material and fines or spent grounds on the floor of the brew cup.

10 Claims, 6 Drawing Figures

U.S. Patent April 6, 1976 3,948,157
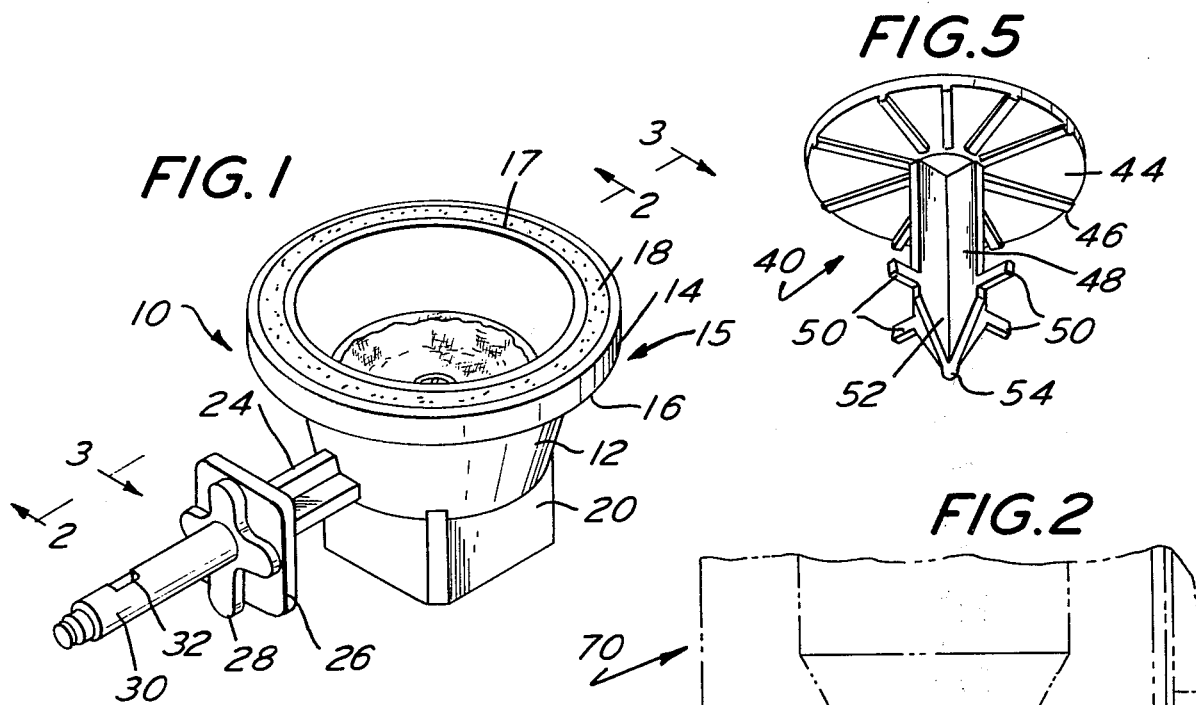
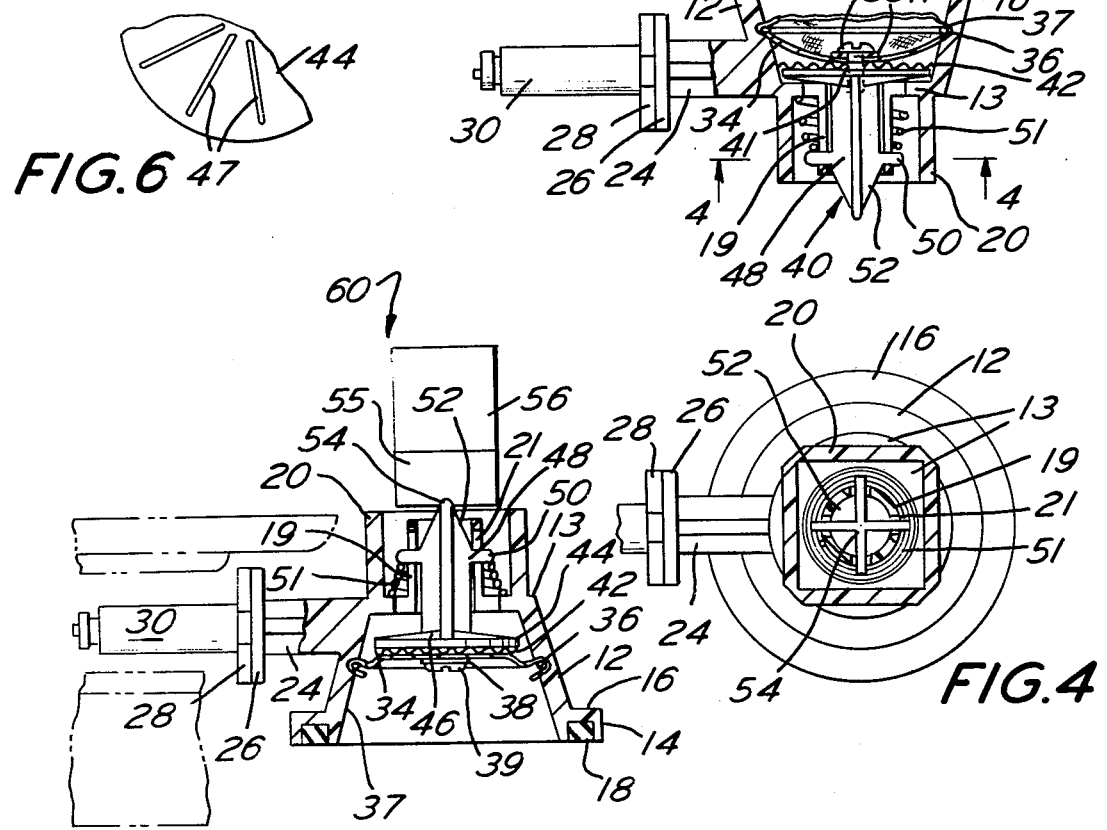

BREW CUP FILTER

BACKGROUND OF THE INVENTION

1. Field of the Invention

This invention pertains to hot beverage brewing apparatus. More specifically, it pertains to a filter for use in a brew cup used in such apparatus, whereby substantially all of the spent grounds and fines are discarded after the brewing operation has taken place.

2. Description of Prior Art

This improved filter is intended for use in a brew cup and brewing machine of the type described in U.S. Pat. No. 3,483,811, issued to Heier. This patent shows an apparatus which contains several stations including:

1. a dispensing station for discharging a predetermined quantity of particulate solids such as, for example, ground coffee;
2. a brewing or infusion station at which a predetermined quantity of hot water may be dispensed and infused through the solids to yield the hot beverage; and
3. a dumping station for disposing spent solids from the brew cup.

The filter of the present invention is used with a brew cup similar to that shown in the Heier patent. That patent does not teach a use of any filter whatsoever in the brew cup, the separation of the grounds from the finished product being accomplished solely by means of an apertured plate connected to the top of the guide spider. In such an arrangement, the grounds and fines often cake up on the plate and cannot be readily removed. Also, the grounds are able to work their way around the edges of the plate and find their way into the finished drink. Both the cleaning and the replacement of the plate are time consuming, difficult and costly. The filter of the present invention avoids all of these problems.

Other prior art filters have not been effective in alleviating these problems. It has been suggested that individual sheets of filter paper be used in brewing each cup of coffee. However, this has been unacceptable because of the expense thereof and because of the complexity of the mechanism for feeding and removing the individual sheets of filter paper.

It has also been suggested that a stainless steel electroetched filter be utilized. While this has proven generally satisfactory, the stainless steel filter is expensive and must be cleaned periodically. Some fines still become clogged in the filter.

It has been further suggested that a nylon filter be used in combination with a stainless steel electroetched filter. However, neither the expense of the electro-etched filter nor the tendency of the fines to clog the combined nylon and stainless steel filters is eliminated. Caking of the grounds and channeling of the water through particular areas of the grounds are also a problem in these devices.

U.S. Pat. No. 3,651,947, issued to Schollhamer and assigned to the assignee of the present invention, teaches an improved filtering means comprising a nylon or dacron filter disposed over a mesh stainless steel screen. While this filter is excellent in use, it is a stationary filter that is not subject to vertical movement. Accordingly, this filter could not be used although it is desirable that the same filter element be used.

The filter of the present invention obviates not only the problem of channeling and caking but also prevents substantially all grounds or fines from reaching the finished beverage. In addition, the filter has a self-cleaning feature that increases both the life and utility of the filter.

SUMMARY OF THE INVENTION

The invention pertains to filters for brew cups used in brewing machines of the single cup, multiple station type. The brew cup, sometimes termed in the prior art a "brewing cavity," is transferred to the different stations.

At the first station, the solids dispensing station, particulate solids, such as coffee, are dispensed into the brew cup. The filter is atjached to the inside walls of the brew cup, thus preventing any of these particulate solids from reaching the finished beverage.

The next station is the brewing or infusing station, at which hot water is allowed to drip or is forced through the solids in the brew cup. During this step, the prior art devices have frequently allowed the grounds or fines to reach the final beverage in the drinking cup. It is at this station where the problem of channeling also occurs. The present filter obviates both of these problems. Since the filter material is attached to the inner walls of the brew cup and to the center of the guide spider, more equal distribution of the coffee grounds is allowed, thus overcoming the channeling problem.

The next station is the grounds dumping station. When the brew cup reaches this station, it is inverted allowing the grounds to be dumped. Several machines, such as the one shown in U.S. Pat. No. 3,483,811, to Heier, have dumping discharge aids. While these aids often help break up the caked grounds, the filter of the present invention is made to ensure that substantially all of the grounds are discarded. In its normal position, the guide spider is urged to the bottom of the brew cup thus causing the filter material to be relatively tightly stretched between the side wall of the brew cup and the center of the guide spider. That is, the filter material touches the wall of the brew cup and the guide spider only at the points of attachment.

During dumping, the guide spider is moved toward the top of the brew cup causing a slackening of the filter material. Toward the completion of the dumping step, the guide spider is quickly released and allowed to return to its normal position causing a snap action of the filter material to eject any of the grounds which might have become caked on the filter. Upon leaving the dumping station, the brew cup is returned to its normal upright position ready for the beginning of another cycle.

The present filter allows substantially no spent grounds or fines to reach the finished beverage. The problem of channeling is also overcome and thus, a more consistent beverage is produced. The filter material has a long life, is relatively inexpensive and is easily replaced.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is a perspective view of the brew cup and filter in accordance with the present invention.

FIG. 2 is a side elevation view of the brew cup and filter partly in section taken along the line 2—2 of FIG. 1, showing the brew cup in cooperation with the brewing or infusion station shown in phantom.

FIG. 3 is a side elevation view of the brew cup and filter partly in section taken along the line 3—3 of FIG. 1, shown in inverted position cooperating with the dumping station shown in phantom.

FIG. 4 is a bottom view of the brew cup and guide spider partly in section taken along the line 4—4 of FIG. 2.

FIG. 5 is a perspective view of the guide spider looking from beneath the guide spider.

FIG. 6 is a partial top plan view of the plate member.

DESCRIPTION OF THE PREFERRED EMBODIMENT

Referring to the drawings in detail, wherein like numerals indicate like elements throughout the several views, there is shown in FIG. 1 a brew cup in accordance with the present invention designated generally as 10. The brew cup is made preferably of polymeric plastic and may be injection molded although materials such as stainless steel may be used if desired. While the brew cup may be any suitable shape, the presently preferred general shape is that of an inverted, truncated cone, having side walls 12 with the top having a larger diameter than the bottom. For purposes of this description, the top of the brew cup is the uppermost portion thereof in FIG. 1.

The cup is provided with an annular rim 15 having an outer peripheral wall 14, a lower peripheral wall 16, and an inner peripheral wall 17. An annular, resilient sealing gasket 18 fits between walls 17 and 14.

The cup includes bottom wall 13, best seen in FIGS. 2, 3 and 4. Depending from bottom wall 13 is an axial discharge sleeve 19. The axial discharge sleeve 19 is enclosed within a hollow, boxlike housing 20, also depending from and integral with the bottom of the brew cup.

Integrally connected to the cup is fluted shaft 24 to which is connected a steadying block 26 and pinion 28. The pinion 28 is used to invert the cup upon reaching the dumping station by means not shown. See U.S. Pat. No. 3,483,811 for a full discussion of the inverting mechanism. Shaft 30 is coaxial with fluted shaft 24 and extends from and is integral with the pinion 28. Slot 32 is cut partway through the shaft 30 and is connected to transfer means not shown.

In FIG. 5, there is shown a guide spider generally designated as 40. The guide spider includes plate member 44, having radial, tapered ribs 46 on the underneath surface thereof. As shown in FIG. 6, similar radial ribs 47 are provided on the top surface of member 44. Ribs 47 prevent oils and acceptable solids which pass through filter material 34 from building up on the top surface of member 44. Depending from plate member 44 are a plurality of fluted walls 48, having lugs 50, tapered portions 52 and tip 54. As best seen in FIGS. 2, 3 and 4, the guide spider 40 fits within the brew cup 10 such that the opening in bottom wall 13 is covered by plate member 44. The lugs 50 on each of the fluted walls 48 project through vertical slots 21 in the axial discharge tube 19.

A coil spring 51 keeps the lugs at one extreme of the guide slots so that the plate member 44 normally resiliently engages bottom 13. Plate member 44 has a diameter slightly smaller than the inside bottom diameter of the brew cup to allow brewed beverage to pass through the opening in bottom wall 13 and into a drinking cup not shown.

A preferred embodiment is shown in FIGS. 2 and 3. The filter material 34 is comprised of a porous fabric material selected from the group consisting essentially of polyesters and polyamides having a thickness of from about 0.002 to about 0.004 inches and having openings of a mesh size of between about 52 and about 100 microns. Smaller openings may be clogged by the fines and larger openings may result in fines passing through the filter. A suitable polyamide would be nylon and a suitable polyester would be Dacron.

Filter material 34 is attached to the side walls 12 of the brew cup 10 along the inner periphery of the brew cup at a level between the extended position of member 44 and the top of the brew cup by any suitable means. The presently preferred means for attachment is a snap ring 36, made of metal, plastic or other convenient material, which holds filter material 34 in a peripheral groove 37.

The center of filter material 34 is attached to the center of plate member 44 of guide spider 40 by any suitable means, such as screw 39, which passes through a washer 38, through filter material 34, through screen 42 and into threaded hole 41 in the guide spider 40. The presence of screen 42 is not essential to the operation of the filter but is presently preferred. The screen 42 is preferably an 18 × 18 mesh screen woven from stainless steel wire having a diameter of about 0.017 inches. The screen 42 is the same shape as the plate member 44, but of slightly smaller diameter area than the diameter of the plate member 44. The presence of the screen 42 aids in reducing channeling of the liquid through the grounds and in reducing caking.

The plate member 44 may be solid, as there is sufficient spacing between its edges and the side walls 12 so that liquid may pass therebetween. Alternatively, plate member 44 may be apertured and may be an 18 × 18 mesh screen.

Thus, the filter material 34 is in contact with the brew cup only at its points of attachment, and likewise only touches the screen 42, or plate member 44 if no screen 42 is used, at its point of attachment when in its normal, upright state as shown in FIG. 2; that is, when it is not dumping. This is an important feature of the filter as described below.

The operation of the brew cup mechanism is described in detail in the Heier Patent, U.S. Pat. No. 3,483,811, so only the effect of the novel filter material 34 on the overall operation will be described herein. FIG. 2 shows brew cup 10 at the brewing or infusion station 70, in phantom, ready to brew solids, such as coffee, tea, etc. Sealing gasket 18 is in contact with contact member 22 of the brewing or infusion station 70 to effect a seal between the station 70 and the brew cup. Filter material 34 is in contact with the brew cup and guide spider 40 or screen 42 only at the points of attachment. The brew cup then travels to the brewing station 70 where liquid, usually hot water, is either forced through or allowed to drip through the solids in the brew cup. At this time, the filter material 34 is still substantially in spaced relation to the walls of the brew cup and guide spider or screen except at the points of attachment. Some movement of the filter material 34 towards the bottom of the brew cup occurs as the liquid is introduced as the result of increased weight of the wet solids.

In FIG. 3, the brew cup is shown at dumping station 60, in phantom, where the brew cup is inverted. Tip 54 of the guide spider comes in contact with inclined surface 55 of cam 56 of the dumping station as the brew cup moves in the direction perpendicular to the plane of the paper into the paper.

Plate member 44 of the guide spider 40 is displaced from its normal position adjacent to and touching bottom wall 13 of the brew cup. The top surface of plate member 44 (in FIG. 3, the lower surface) is moved to a level in the brew cup not above (in FIG. 3, not below) the level of attachment of the filter material 34 to the side walls 12. When in this position, filter material 34 may, and usually does, come into contact with plate member 44 or screen 32 as well as the side walls 12 at points other than only at the points of attachment. This movement of the guide spider 40 effectively causes most of the spent grounds and fines to be dumped.

Frequently in the prior art, some of the caked solids adhered to either the walls of the brew cup or plate member 44. With the present filter material 34, substantially all of the solids are ejected when the brew cup travels in the direction indicated by arrow 62. Thereafter, the guide spider plate member 44 is quickly returned by coil spring 51 to its normal position adjacent the bottom wall of the brew cup. During this retraction step and before the brew cup is returned to its normally upright position, filter material 34 is pulled rapidly away from the side walls and the plate member 44 or screen 42, except at the points of attachment thereto, creating a "snap" or "flex" action which ejects substantially all of the grounds and fines from the brew cup.

The "flexing" or diaphragm action is deemed essential to operation of the instant invention. The flexing action will not be effective if the filter material 34 were permitted to rest upon the bottom of the brew cup. Once the brew cup is righted, the cycle may start anew.

The filter material 34 may be used a long time before replacement or cleaning is necessary, and replacement or cleaning of both the filter material 34 and screen 42 is fairly simple and inexpensive.

The present invention may be embodied in any of the specific forms without departing from the spirit of essential attributes thereof and, accordingly, reference should be made to the appended claim, rather than to the foregoing specification as indicating the scope of the invention.

I claim:

1. Filtering means for use in a beverage making machine comprising a brew cup having side walls and a bottom wall, an opening in said bottom wall, an axial discharge sleeve depending from said bottom wall and being arranged to receive beverage flowing through said opening, a guide spider comprising a plate member and an extension depending from said plate member, said guide spider being within said brew cup such that said plate member is adapted to overlie said opening and said extension is received within said sleeve, means for urging said plate member in resilient juxtaposition to said bottom wall, filter material attached at the central portion of said plate member and means securing said filter material to said side walls of the brew cup at an elevation above the bottom of the brew cup such that said filter material is dish shaped in configuration when said plate is in juxtaposition to said bottom wall of said brew cup, the lowermost portion of the side walls of said brew cup adjacent said bottom wall being substantially free from contact with said filter material.

2. The filtering means of claim 1 wherein the filter material comprises a porous fabric material selected from the group consisting essentially of polyesters and polyamides having a thickness of from about 0.002 to about 0.004 inches and having openings of a mesh of between about 52 and about 100 microns.

3. The filtering means of claim 1 including a filter screen mounted on said plate member, said screen being the same shape as the plate member but of slightly smaller area than the top surface of said plate member, and said screen is an 18 × 18 mesh screen, woven from stainless steel wire having a diameter of about 0.017 inches, said filter material being connected to said side walls by a snap ring entering a peripheral groove at a level between the extended position of said plate member and the top of said walls of the brew cup.

4. The filtering means of claim 3 including fastening means for attaching said filter material to said plate member, said fastening means being a screw passing first through a washer, then through said filter material, then through said screen and into a threaded aperture in the center of said plate member of said guide spider.

5. Filtering means for use in a beverage brewing machine comprising a funnel shaped brew cup having side walls tapered towards a bottom wall, said bottom wall having an opening therein to permit the flow of beverage therethrough, a plate member overlying said bottom wall of said brew cup, means urging said plate member into contact with said bottom wall, filter material attached to the side walls of the brew cup along the inner periphery of said brew cup at a level between the extended position of said plate member and the top of said walls, said filter material additionally attached to the center of the plate member so that said filter material is dish shaped in configuration.

6. Filtering means as set forth in claim 5 wherein said side walls of said brew cup contain at least one peripheral groove and said filter material is attached to said side walls by means of a snap ring holding said filter material within a peripheral groove.

7. Filtering means as set forth in claim 6 wherein said filter material is connected to said side walls of said brew cup at the mid point between the uppermost edge and the bottom wall of the brew cup and the lowermost portion of said brew cup adjacent said bottom wall being free from contact with said filter material.

8. The filtering means of claim 5 wherein said plate member is solid and a screen is located between the uppermost surface of said plate member and said filter material, said filter material being attached to the plate member by fastening means passing through said filter material, through said screen and into said plate member.

9. The filtering means of claim 8 including a washer overlying said filter material, said fastening means being a threaded connector passing through said washer, said filter material, said screen and into a threaded aperture in substantially the center of said plate member.

10. The filtering means of claim 8 wherein radial ribs are provided on the upper surface of said plate member, said screen resting on said ribs.

* * * * *